United States Patent
Xue et al.

(10) Patent No.: US 10,823,872 B2
(45) Date of Patent: Nov. 3, 2020

(54) CORRECTION METHOD FOR TRANSIENT ELECTROMAGNETIC METHOD-BASED PREDICTION OF WATER-BEARING STRUCTURE AHEAD OF TUNNEL WALL

(71) Applicant: Institute of Geology and Geophysics, Chinese Academy of Sciences, Beijing (CN)

(72) Inventors: Guoqiang Xue, Beijing (CN); Xiu Li, Beijing (CN); Bin Liu, Beijing (CN); Huaifeng Sun, Beijing (CN); Qingyun Di, Beijing (CN); Dongyang Hou, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 309 days.

(21) Appl. No.: 16/013,932

(22) Filed: Jun. 20, 2018

(65) Prior Publication Data

US 2019/0391293 A1   Dec. 26, 2019

(51) Int. Cl.
  *G01V 3/38* (2006.01)
  *G01V 3/10* (2006.01)
(52) U.S. Cl.
  CPC . *G01V 3/38* (2013.01); *G01V 3/10* (2013.01)

(58) Field of Classification Search
  CPC .................................. G01V 3/38; G01V 3/10
  See application file for complete search history.

(56) References Cited

FOREIGN PATENT DOCUMENTS

CN          102495431 A  *  6/2012

OTHER PUBLICATIONS

Yao, Lijun et al., "Use of a Reference Point Method to Calibrate the Field Uniformity When Testing with Transient Electromagnetic Fields", Apr. 2017, IEEE Trnasactions on Electromagnetic Compatibility, vol. 59, Issue 2, pp. 352-359.*

* cited by examiner

*Primary Examiner* — Manuel L Barbee
(74) *Attorney, Agent, or Firm* — Bayramoglu Law Offices LLC (57) ABSTRACT

The present invention relates to a correction method for transient electromagnetic method-based prediction of water-bearing structure ahead of tunnel wall, which pertains to the technical field of transient electromagnetic sounding method. The correction method includes a method for eliminating effects of transition process in a reception probe and a method of using earth conductivity to eliminate effects of transition process. By using the correction technique, more accurate information about the location, size and shape of the object in front of the tunnel wall can be obtained, which is of great significance to the study of the fine water-bearing geological structure.

3 Claims, 6 Drawing Sheets

CORRECTION METHOD FOR TRANSIENT ELECTROMAGNETIC METHOD-BASED PREDICTION OF WATER-BEARING STRUCTURE AHEAD OF TUNNEL WALL

TECHNICAL FIELD

The present invention relates to a correction method for transient electromagnetic method-based prediction of water-bearing structure on tunnel wall which pertains to the technical field of transient electromagnetic sounding method.

BACKGROUND

Currently, the techniques and methods of advanced geological prediction of tunnels (or caves) at home and abroad mainly include geological method, geophysical method, and horizontal drilling method. Geophysical method mainly includes tunnel seismic prediction (TSP) method, seismic reflection tomography technique true reflection tomography (TRT) method, seismic negative apparent velocity method, ground penetrating radar method, HSP—horizontal sound probing method, land sonar method, high-density electrical method, electromagnetic method, and infrared water detection method.

At present, the TSP tunnel seismic wave advanced geological prediction system used at home and abroad is developed specially for the advanced geological prediction of tunnel and underground construction. However, the system is costly, the amount of information extracted is less, and the rate of successfully predicting the occurrence of water which is the key problem in tunnel construction is quite low. Seismic reflection negative apparent velocity method and land sonar both pertain to the reflection method in elastic wave method, which have obvious reflections on upright objects, but are helpless for inclined objects and large crushed zones with obvious refraction characteristics, especially for determining whether the crushed zones are filled with confined water or not. Since a great amount of groundwater has low temperature, the gradual decreasing trend of temperature on the tunnel wall can be detected in far infrared remote sensing when approaching groundwater. However, the temperatures are not in a one-to-one correspondence relation with groundwater, so the effects obtained in application are far from satisfying. Since the advanced exploratory drilling is costly and takes long period, the construction progress is greatly affected, so it is mainly used for medium-term and long-term monitoring of unfavorable strata. Currently, the detection of groundwater in front of the tunnel wall during the construction is still an open question. In the tunnel geological science and technology appraisal meeting held by Chinese Ministry of Railways in the year of 1995, first-class experts of China who attended the meeting have proposed that it is of great importance to go deep into the study of this subject. Therefore, the problem of geological prediction in front of the tunnel wall in the tunnel construction may be addressed by using new methods and techniques.

SUMMARY

The objective of the present invention is to provide a correction method for transient electromagnetic method-based prediction of water-bearing structure on tunnel wall. Specifically, the correction method for transient electromagnetic method-based prediction of water-bearing structure on tunnel wall includes a method for eliminating effects of transition process in a reception probe and a method of using earth conductivity to eliminate effects of transition process.

The method for eliminating effects of transition process in a reception probe specifically includes: with known earth conductivity (named data1) of an engineering site, calculating a conductivity value (named data 2) according to an actually measured voltage attenuation curve; comparing two pieces of data to obtain a ratio of data1 and data 2, and using the ratio to perform an inverse calculation to obtain a correction coefficient of the original data to eliminate the effects of transition process in the reception probe.

The method of using earth conductivity to eliminate effects of transition process specifically includes: arranging a survey line, a direction of a secondary field $\Delta\varepsilon_1$ generated in front of the survey line is opposite to a direction of a primary field transmitted, along a reception direction of the probe; a direction of a secondary field $\Delta\varepsilon_2$ generated behind the survey line is the same as the direction of $\Delta\varepsilon_1$, along the reception direction of the probe, $\Delta\varepsilon_1 \approx \Delta\varepsilon_2$. A secondary field received by the reception device is the sum of the two secondary fields $\Delta\varepsilon = \Delta\varepsilon_1 + \Delta\varepsilon_2$. An interference signal of the tunnel received in a detection on the tunnel wall is $\frac{1}{2}\Delta\varepsilon$. The tunnel effect $\frac{1}{2}\Delta\varepsilon$ is subtracted from a tunnel wall signal to obtain a useful signal in front of the tunnel wall.

Further, the conditions for obtaining the actually measured voltage attenuation curve in the method for eliminating effects of transition process in a reception probe specifically includes: placing a 50×50 m transmitter loop in a relatively open area and selecting the reception probe as a receiving device, wherein the transmitting fundamental frequency is 225 Hz.

Further, the arrangement of the survey line in the method of using earth conductivity to eliminate effects of transition process specifically includes: arranging the survey line under a condition where no other effects exist in an area 50 m before and 50 m behind the middle of the tunnel.

The present invention has the following advantages. The present invention discloses a correction technique in the detection of the water-bearing structure on tunnel wall based on transient electromagnetic method, which includes: 1) an elimination of the effects of transition process in the reception probe by using the earth conductivity. 2) a correction method of the tunnel effects. As a result of the correction technique, more accurate information about the location, size, and shape of the object in front of the tunnel wall can be obtained, which is of great significance to the study of the fine water-bearing geological structure.

DETAILED DESCRIPTION

The embodiments of the present invention will be described in detail below with reference to the drawings.

Transient electromagnetic sounding method is a time domain electromagnetic method, in which the principle of measurement is to transmit a pulsed magnetic field (or electric field) to the ground by using an ungrounded loop line (or electric dipole source), namely, a current pulsed square wave is supplied on the transmitting return line. At the moment when the back edge of the square wave drops, a primary transient magnetic field propagating to the ground will be generated, and a vortex will be generated inside the geological body under the excitation of the magnetic field. The magnitude of the vortex depends on the electric conductivity of the geological body. If the electric conductivity is strong, the induced vortex is strong. After the primary field disappears, the vortex would not disappear immediately, and there will be a transient process (attenuation process). The transient process generates an attenuated secondary field which propagates to the ground. A reception coil is used to receive the secondary magnetic field on the surface of the ground. The change of the secondary magnetic field will reflect the electrical property of underground medium. The characteristics of the secondary field attenuating over time are obtained by measuring the secondary induced electromotive force in a receiver according to different delay time.

Figure 1A:
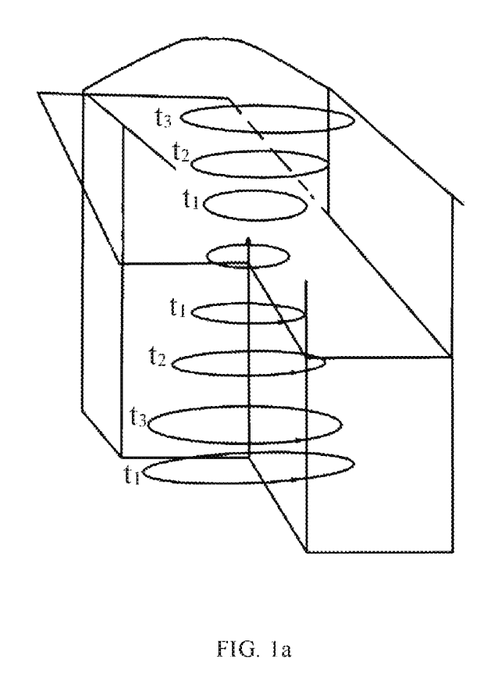
FIG. 1a is a schematic diagram of transient electromagnetic tunnel working vortex field by observing the transient electromagnetic vortex field along the tunnel.
Figure 1B:
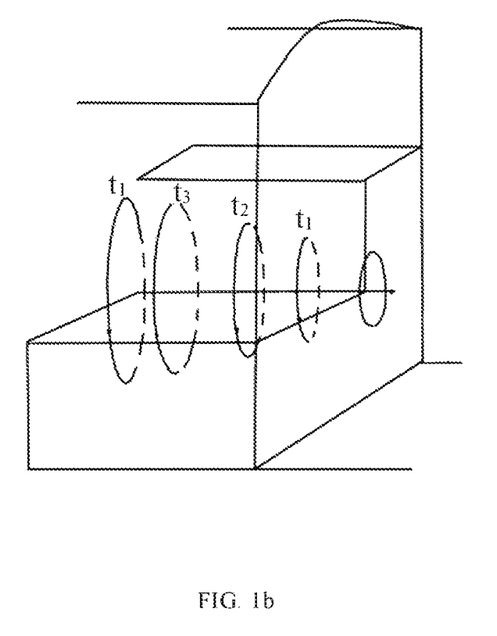
FIG. 1b is a schematic diagram of the transient electromagnetic tunnel working vortex field by observing the transient electromagnetic vortex field on tunnel wall.

Selection of Transmitting Device:

Transient electromagnetic field is a kind of vortex field which propagates in a medium in the form of diffusion. When working in a tunnel, two main methods may be adopted, one method is to observe in the excavated space along the tunnel direction to survey the surrounding rock condition of the top and bottom of the tunnel, and the other method is to observe on the tunnel wall to survey the geological structure condition in front of the tunnel wall. The field of the first method is a full-space field, as shown in FIG. 1*a*, the vortex field propagates downward and upward at the same time. The propagation of the field of the second method is relatively complex, but when both of the length and height of the tunnel wall is five times longer than the side length of the emission loop, the effect of the induction field generated by the surrounding rock on the side of the tunnel can be ignored, and it may be taken as the vortex field only propagates in the direction towards the medium in front of the tunnel wall, approximately. The propagation mechanism of the field in this approximation is closer to a half-space field, as shown in FIG. 1*b*. In order to survey the geological structure in front of the tunnel wall, the present invention adopts the second method, namely, the transient electromagnetic method observation is directly carried out on the tunnel wall.

Figure 2:
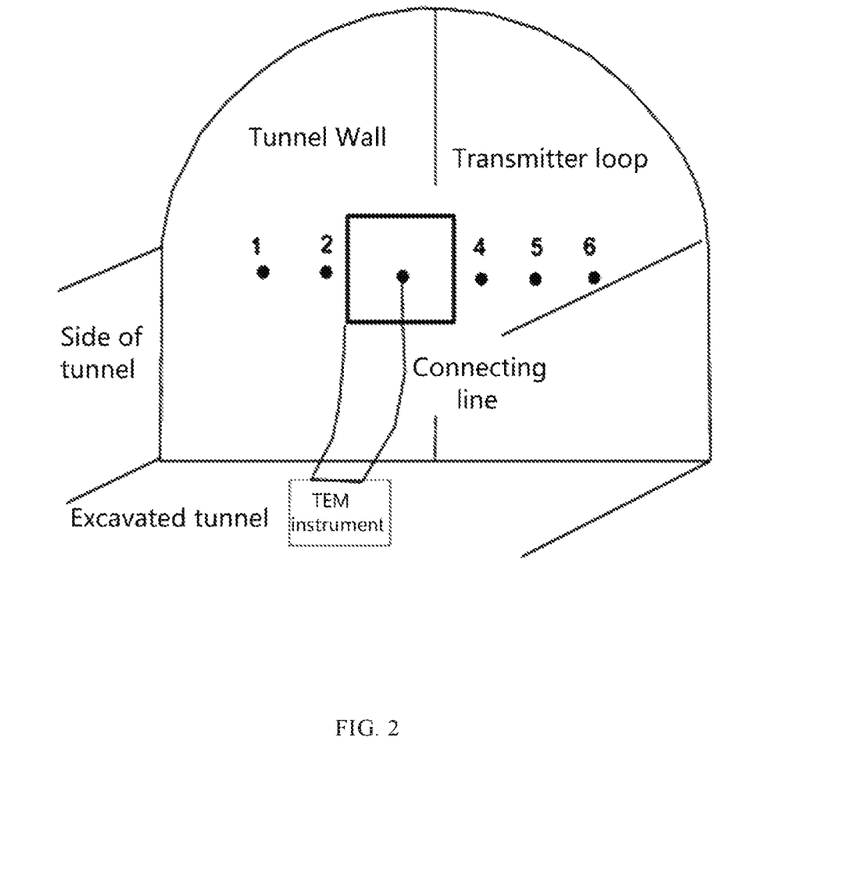
FIG. 2 is a schematic diagram of a transient electromagnetic advanced prediction device.

Regarding the special working environment of the tunnel, the side length of the transmitter loop may be determined according to the size of the tunnel wall and the maximum detection depth. Generally speaking, the highway tunnel wall is wider which has a width of about 12 m, and the width of the excavation tunnel wall of railway tunnel wall and diversion tunnel etc. is approximately 7 m. Therefore, the side length of the transmitter loop is determined as 3 m. In this way, when a measurement is carried out on the tunnel wall, 6-8 measurement points can be set in the railway tunnel and 10-12 measurement points can be set in the highway tunnel. The working device is shown in FIG. 2. The transmitter loop is fixed on a bracket, a reception magnetic probe is fixed in the middle of the transmitting bracket, and the whole device is placed on the tunnel wall uprightly, as shown in FIG. 2. The distance between measurement points is about 0.5 m. The observation is performing by moving the bracket point to point, and the observation data of each measurement point can be obtained.

Because our detection range in front of the tunnel wall is required to be within 50 m, an experimental study was carried out to determine the number of turns of the transmitter loop. A comparison experimental research is made among coils of different specifications i.e. 3 turns, 5 turns and 8 turns.

Figure 3:
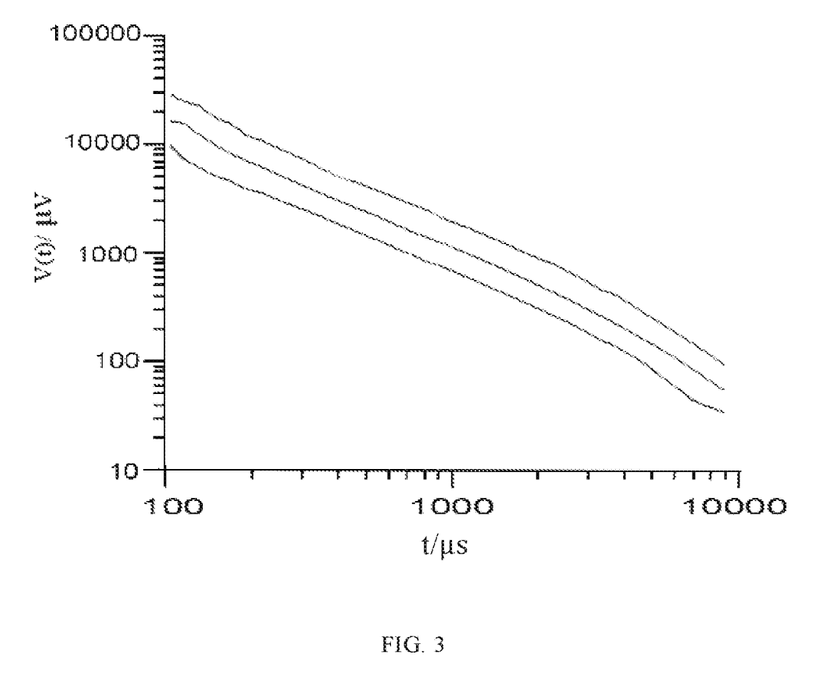
FIG. 3 shows the actually measured induced voltage attenuation curves of three kinds of transmitter loops.

FIG. 3 is a comparison diagram of actually measured attenuation curves measured by using three kinds of coils at the same measurement point of the survey line of the same tunnel wall. The three curves in FIG. 3 are measured by coils with 3 turns, 5 turns and 8 turns in a bottom-to-top order.

As can be seen from FIG. 3, the actually measured attenuation curves of three kind of coils with different turns at the same measurement point are basically the same, but the signal measured by the coil with 8 turns is stronger than coils with other number of turns, so the anti-interference ability of the coil with 8 turns is relatively stronger. Therefore, according to the comparison situation, the number of turns of the transmitter loop are selected as 8. By doing so, a stronger signal can be obtained which is not easy to be interfered during the detection. Moreover, because of the large transmitting area, a greater detection depth can be reached.

Selection of Receiving Device:

When detecting in the tunnel, the reception coil used in the aboveground detection cannot be directly copied and applied, the reasons are as follows. 1) If the reception coil is directly reused, the reception area would be large due to the restriction of the size of the tunnel wall. Additionally, if the reception area is increased by increasing the number of turns of the reception coil, the reception coil will generate larger self-induction and mutual inductance between the coils. 2) If the reception coil is directly reused as the receiving device, the received signal not only includes the signal in front of the tunnel wall, but also partially includes the signal of the excavated tunnel behind the tunnel wall, and is greatly affected by the supporting steel arch etc. of the excavated tunnel.

Figure 4:
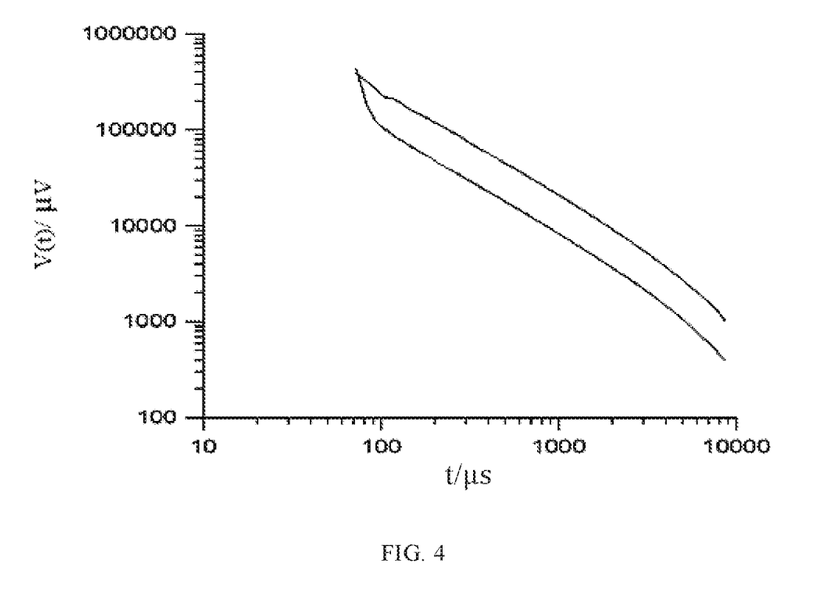
FIG. 4 is a comparison diagram of the actually measured attenuation curves of different reception devices.

Therefore, the receiving device must be a special reception probe. In order to verify the application effect of reception probe, reception probe and reception coils (with 3 turns) are respectively used for detection in the tunnel and a comparison is made. The comparison of attenuation curves in the situations of two kinds of reception devices is shown in FIG. 4. In FIG. 4, the upper curve relates to the probe reception and the lower curve relates to the coil reception.

In FIG. 4, the comparison of the attenuation curves of different reception devices at the same measurement point in the tunnel is shown. As can be seen from the figure, except that the signal received by the coil device is larger at the early stage of attenuation, the form of other parts of the two curves are basically the same, but the signal received by the reception coil is obviously smaller. Because SB-250 K(p) transient field magnetic probe is selected as the probe in the experiment, the shielding tube in the front of the probe can reduce the effect of external interference when used in the underground tunnels, and the signal behind the probe can be shielded by specially processing the rear part of the probe.

Since the effective area of the probe (211 m$^2$) is far larger than the equivalent area of the coil (27 m$^2$), and the sensitivity of the probe is greater than 0.9 μv/nT·Hz (other indicators of the probe follow in the passage), the reception probe can receive weak signals generated by unfavorable geological body in front of the tunnel wall, thus increasing the detection discernibility. From the comparison, it can be seen that the detection requirements of tunnel can only be satisfied by using the probe as a reception device.

Selection of Time Windows and Number of Superposition Times:

Generally speaking, it is desirable to choose the time window as wide as possible in practice to record useful signals within a wide delay range. While the number of superposition times is expected to be less, so as to improve the speed of observation. These two points mainly depend on the signal-to-noise ratio of the observation device used in the measurement area. Tests may be carried out before the detection in order to choose the appropriate time window range and number of superposition times. If the last few readings are instrument noise levels, it means that the useful signals have been recorded, and the selection of time window range and the number of superposition times is appropriate. If the last few readings exceed the noise level but have great fluctuation, it means that the noise level has not been reached, the time window range and number of superposition times should be increased until the last few readings are just noise levels.

Technique to Eliminate Effects of Transition Process in the Reception Probe

In order to analyze the characteristics of inherent transient response in the reception probe, the transmitter loop is placed uprightly in an open area and kept away from the ground as far as possible. By doing so, the measured signal is a pure transient response.

Figure 5:
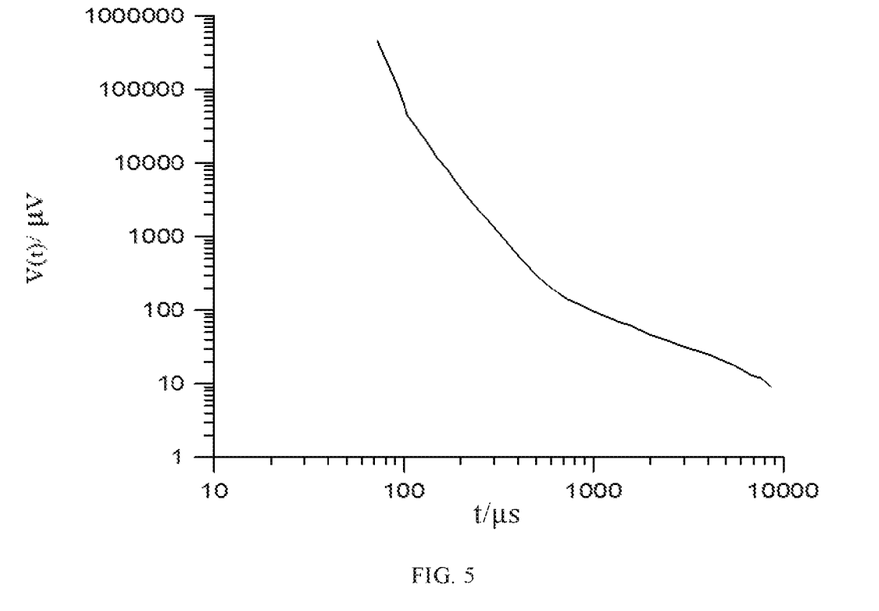
FIG. 5 is a diagram showing an actually measured voltage attenuation curve when the coil is suspended.

As shown in FIG. 5, when the coil is suspended, there is a transition field. In the experiment, the transmitting fundamental frequency is 25 Hz, the number of samples are 40, and the time window range is 72.5 μs-8640 μs. As can be seen from the figure, the attenuation curve attenuates relatively faster before 742 μs, but slower after that, and reaches the minimum at 8640 μs.

Therefore, when detecting in the tunnel, if the effect of transition process in the probe on the tunnel wall is obtained, the useful signal can be obtained by subtracting the signal from the actual detected signal. However, it should be noted that since this transition field relates to the coupling of surrounding media, the transition field measured in the air is only roughly equivalent to the transition field on the tunnel wall but not completely the same. In this case, another method is used, namely, the method of using earth conductivity to eliminate effects of transition process.

According to the analysis above, the present invention proposes a method of using earth conductivity to eliminate effects of transition process. The method studies the effects of the transition field in combination with the electric conductivity of rock (known) in the engineering site. By using the electromagnetic response of the background field on the profile, the electric conductivity is calculated and compared with the known electric conductivity of rock to obtain the correction coefficient.

Figure 6:
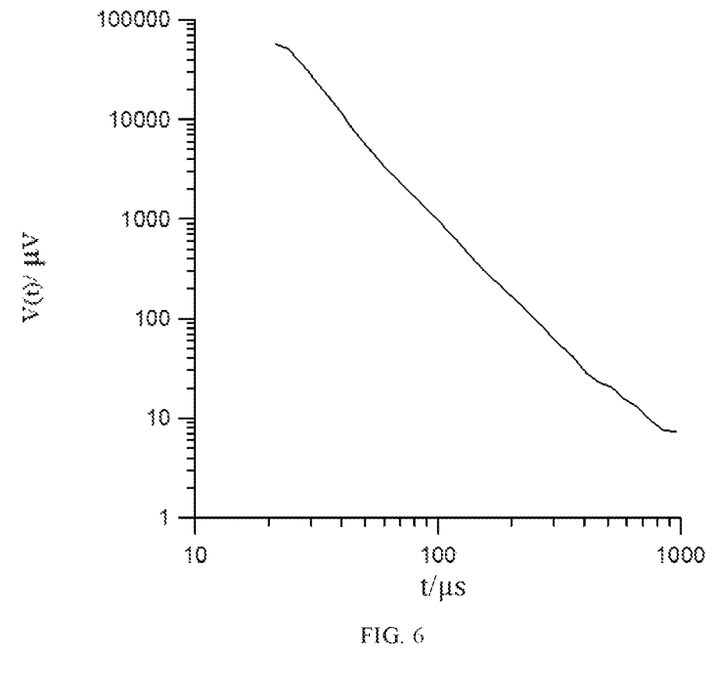
FIG. 6 is an actually measured voltage attenuation curve diagram.

The specific experimental scheme is as follows. 50×50 m transmitter loop is placed in a relatively open area, and the reception probe is selected as the reception device. The transmitting fundamental frequency is 225 Hz. The actually measured voltage attenuation curve under the situation of using this device is shown in FIG. 6.

Because the earth conductivity (named data1) of the engineering site is known, the electric conductivity value (named data2) is calculated according to the actually measured attenuation curve above. A ratio of data1 and data2 is obtained by comparing the two pieces of data. A correction coefficient of the original data is obtained by using the ratio to perform an inverse calculation. The correction coefficient obtained by the calculation in this test is about 2500.

In practical application in tunnel, the above-mentioned experimental method is used to obtain the electromagnetic response of the background field in this section before the detection and calculate the correction coefficient to eliminate the effects of transition process.

Method of Using the Earth Conductivity to Eliminate Effects of Transition Process Through analysis, it can be known that transient electromagnetic detection on the tunnel wall is affected by the excavated tunnel behind the tunnel wall. In order to eliminate the effects, the survey line is arranged within an area 50 m before and 50 m behind the middle of the tunnel where no other effects exist, so as to measure the signal.

Figure 7:
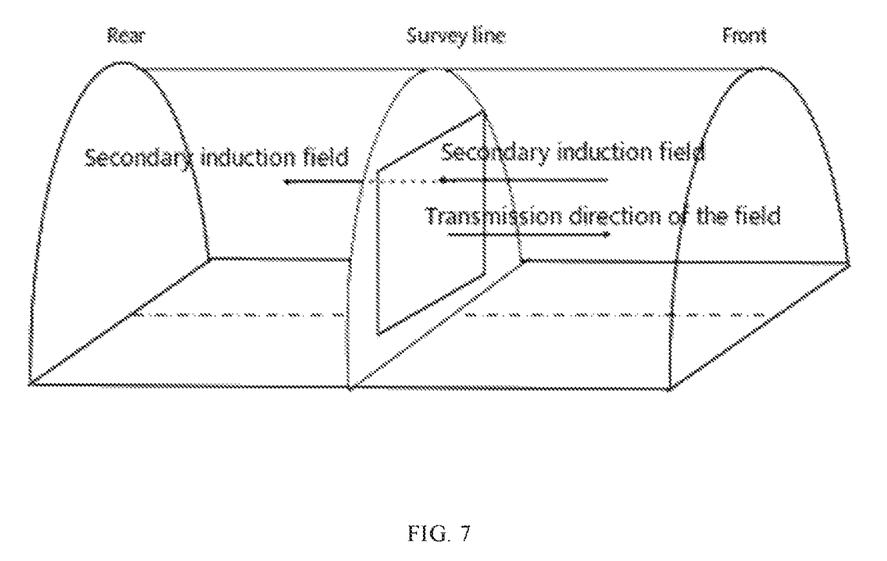
FIG. 7 is a schematic diagram showing TEM tunnel wall tunnel effect detection.

As shown in FIG. 7, when measuring on the survey line, the transmitter loop transmits a primary field. According to the principle of electromagnetic field, the magnetic fluxes of the primary field are closed, so a primary field will also be received behind the survey line while the primary field is transmitted in front of the transmitter loop, and the directions of both primary fields are the same. Under the excitation of the primary field, vortex will be generated before and behind the survey line in the tunnel, and the attenuation of the vortex will generate an attenuated secondary field which propagates in the direction toward the survey line. As shown in the figure, the direction of secondary field $\Delta\varepsilon_1$ generated in front of the survey line is opposite to the direction of the primary field emitted along the reception direction of the probe. The direction of the secondary field $\Delta\varepsilon_2$ generated behind the survey line is just the same as the direction of $\Delta\varepsilon_1$, along the reception direction of the probe. Since the parts of the tunnel before and behind the survey line are roughly uniform, so $\Delta\varepsilon_1 \approx \Delta\varepsilon_2$. It can be known that the secondary field received by the reception device is the sum of the two secondary fields $\Delta\varepsilon = \Delta\varepsilon_1 + \Delta\varepsilon_2$. The interference signal of the tunnel received in the detection on the tunnel wall is ½.

Based on the above analysis, it can be known that in order to eliminate the effects of the tunnel behind the tunnel wall, the tunnel effect ½ should be subtracted from the tunnel wall signal after the signal $\Delta\varepsilon$ is measured to obtain the useful signal in front of the tunnel wall.

The foregoing presents the preferred embodiments of the present invention. It should be noted that for those skilled in the art, many improvements and modifications can be derived without departing from the principles of the present invention, and these improvements and modifications shall also be considered as falling within the scope of the present invention.

The invention claimed is:

1. A correction method for transient electromagnetic method-based prediction of water-bearing structure ahead of a tunnel wall, comprising
    a method of using earth conductivity to eliminate effects of transition process, wherein
    the method of using earth conductivity to eliminate the effects of the transition process comprises: arranging a survey line to align a reception probe, wherein a direction of a first secondary field $\Delta\varepsilon_1$ generated in front of the survey line is opposite to a direction of a primary field transmitted, along a reception direction of the reception probe; a direction of a second secondary field $\Delta\varepsilon_2$ generated behind the survey line is the same as the direction of the first secondary field $\Delta\varepsilon_1$, along the reception direction of the reception probe, $\Delta\varepsilon_1 \approx \Delta\varepsilon_2$, a third secondary field received by a receiving device is a sum of the first secondary field and the second secondary field $\Delta\varepsilon = \Delta\varepsilon_1 + \Delta\varepsilon_2$; an interference signal of a tunnel or a tunnel effect received in a detection on the tunnel wall is $\frac{1}{2}\Delta\varepsilon$, and the tunnel effect $\frac{1}{2}\Delta\varepsilon$ is subtracted from a tunnel wall signal to obtain a useful signal in front of the tunnel wall.

2. The correction method according to claim 1, wherein conditions of the reception probe for obtaining an actually measured voltage attenuation curve in the method of using earth conductivity to eliminate the effects of the transition process comprise: placing a 50×50 m transmitter loop in a relatively open area and selecting the reception probe as the receiving device, wherein a transmitting fundamental frequency is 225 Hz.

3. The correction method according to claim 1, wherein an arrangement of the survey line in the method of using earth conductivity to eliminate the effects of the transition process comprises: arranging the survey line in an area 50 m before and 50 m behind a middle of the tunnel where no other effects exist.

\* \* \* \* \*